United States Patent [19]  [11] 4,119,538
Yamauchi et al.  [45] Oct. 10, 1978

[54] TREATMENT OF WASTE LIQUID AND APPARATUS THEREFOR AND A FERTILIZER COMPOSITION OBTAINED THEREBY

[75] Inventors: Tadashi Yamauchi, Kawasaki; Mikio Akune, Yokosuka; Susumo Kouchi, Tokyo, all of Japan

[73] Assignee: Nittetu Chemical Engineering Ltd., Tokyo, Japan

[21] Appl. No.: 750,375

[22] Filed: Dec. 14, 1976

[30] Foreign Application Priority Data

Dec. 15, 1975 [JP] Japan .................................., 50/148514

[51] Int. Cl.$^2$ .............................................. C02C 5/06
[52] U.S. Cl. ...................................... 210/67; 210/68; 210/71; 210/73 R; 210/74; 71/25
[58] Field of Search .................. 210/63 R, 67, 68, 71, 210/73 R, 74; 71/25, 26

[56] References Cited

U.S. PATENT DOCUMENTS 3,622,511  11/1971  Pizzo et al. ........................ 210/67 X

FOREIGN PATENT DOCUMENTS 647,027   8/1964  Belgium ..................................... 210/67
2,251,211 5/1974  Fed. Rep. of Germany ............. 210/67

Primary Examiner—Ferris H. Lander
Attorney, Agent, or Firm—Bacon & Thomas

[57] ABSTRACT

A process for treating a waste liquid which is obtained from a fermentation process, e.g., an alcohol fermentation, and contains organic and inorganic substances which are useful as fertilizer, is provided which includes combusting a concentrate of the waste liquid and bringing the combustion products containing the ashes which are formed from the inorganic substances and the hot combustion gases into direct contact with a fresh portion of the waste liquid. Thereby the liquid is concentrated by evaporation and a slurry of the ashes in the concentrated waste liquid is formed. The slurry is separated into a solid sediment containing the minerals and a part of the organic components of the liquid and a concentrates mother liquid, at least a portion of which is combusted as the concentrate. By drying the sediment with agitation, a granulate which can be used as a fertilizer can be produced.

19 Claims, 1 Drawing Figure

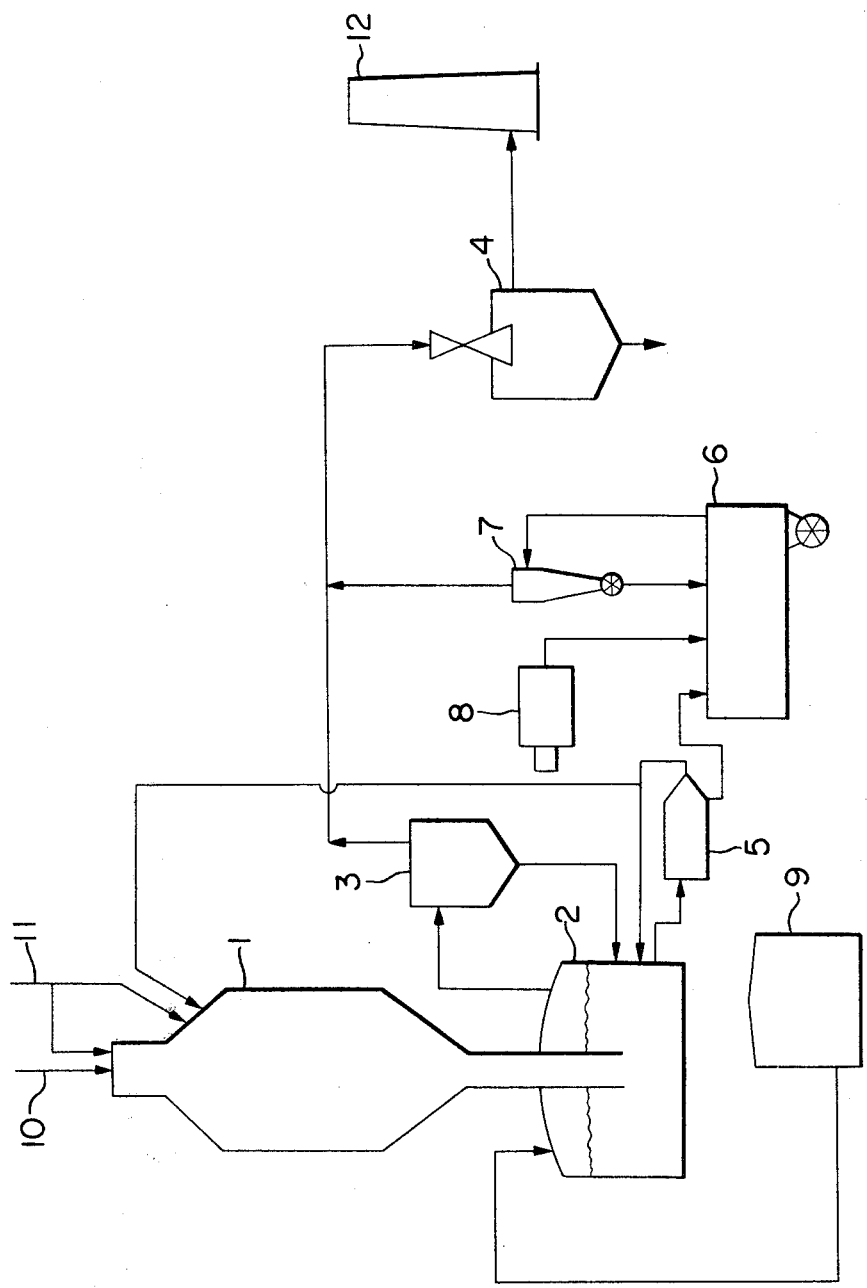

TREATMENT OF WASTE LIQUID AND APPARATUS THEREFOR AND A FERTILIZER COMPOSITION OBTAINED THEREBY

BACKGROUND OF THE INVENTION

The invention relates to the treatment of a waste liquid still containing organic and inorganic components which results from a fermentation process, e.g., from alcoholic fermentation, glutamic acid fermentation, organic acid fermentation, or others.

In recent years, water pollution in rivers and seas has become a particularly difficult problem for fermentation industries where big amounts of waste liquids, for instance, an alcohol distillation waste liquid are obtained as byproducts. For example, when liquors containing waste molasses and yeast are submitted to an alcoholic fermentation process followed by distillation of the resulting alcohols, such waste liquids have to be made harmless before they are released into the rivers and seas.

Conventionally, such waste liquid which contains organic and inorganic compounds has been submitted to a biological treatment such as a methane fermentation treatment or an activated sludge treatment. However, the resulting waste liquid has a brown color and still exhibits a BOD value (Biochemical Oxygen Demand) of 500 to 1000 ppm after such biological treatment, which will create secondary pollution. A known process for overcoming this problem comprises incinerating a waste liquid after concentration and recovering the ashes which are composed of inorganic salts such as potassium salts, calcium salts, or the like.

The recovered ashes include potassium compounds as a major component and also contain calcium, magnesium and silica, and therefore are effective as a fertilizer. However, the ash is obtained in the form of fine powder and, thus, has a tendency to be scattered when spread in the fields. Therefore, it is necessary to further treat the ashes in order to form a granulate. In addition to the minerals, a waste liquid from alcohol fermentation itself also includes organic components which are highly valuable as a fertilizer, such as crude proteins, amino acids and others, and therefore it has been highly desired to effectively use these components as fertilizer. However, the alcohol waste liquid exhibits strong caking and hygroscopic properties as it is concentrated and, therefore, it is difficult to achieve a concentration by mere drying. From a point of view of antipollution and profitable reasource utilization, an attempt has been made in recent years to produce a composition which is suitable as a fertilizer and is convenient for usage, in which the incinerated ashes are mixed with the concentrated waste liquid. Thereby, the adhesive property of the waste liquid is utilized to bind the ashes and to permit them to be granulated in order to reduce the scattering property of the ashes while at the same time the hygroscopic property inherent in the waste liquid as such or in the dried form is reduced. However, concentration of the waste liquid, as well as the incineration of the concentrated liquid and the uniform mixing of the concentrated liquid and the ashes is very difficult to perform in practice. The conventional process is normally such that a concentrated waste liquid is incinerated within a furnace, which is provided with a boiler. In the boiler which utilizes the heat of the combustion steam is produced and then this steam is used to concentrate the waste liquid within a multiple effect evaporator. In such a process, the incinerated ashes frequently adhere to the heated surface of parts of the apparatus such as the boiler tube and spoil its heat transfer performance and have a tendency to plug the flue, resulting in discontinuance of the operation. Furthermore, the multiple effect evaporator need to be frequently passed, e.g., by a chemical washing solution, in order to wash out scales deposited to the wall of it. The washing is, in some cases, required to be carried out after disassembling of the evaporator. Moreover, with the use of such evaporator it is difficult to concentrate the waste liquid to a high degree.

SUMMARY OF THE INVENTION

It is an object of the present invention to provide an economical process for the working up of waste liquids which contain organic and inorganic material especially waste liquids from fermentation processes thereby avoiding the above-mentioned disadvantages of the prior art processes concerning concentration and incineration.

It is a special object of this invention to provide a process which allows the recovery of part of the organic components of such a liquid in addition to the minerals therein.

It is a further object of this invention to provide a process in which concentration of such a liquid is continuously performed in a simple and effective manner.

It is yet a further object of this invention to provide a process which allows the recovery of a uniform mixture of the ashes, which are obtained by incinerating a concentrate of such a liquid, and part of the organic solid components of said liquid, especially a process which allows recovery of such a mixture in granulate form or in a form which is suitable for granulation.

It is a further object of this invention to provide a process by which a fertilizer composition which contains inorganic and organic fertilizing agents is produced, especially a process by which such a fertilizer is continuously produced in a form which is convenient for use preferably in a granulated form or a form suitable for granulation.

Furthermore, it is an object of this invention to provide a process for working up waste liquids without forming toxic, pollution gases thereby avoiding the discharge of any pollution products.

In accomplishing the foregoing objects there has been provided according to the present invention a process for treating waste liquids, which still contain organic and inorganic components especially waste liquids which are derived from fermentation processes. The process includes combusting a concentrate of the waste liquid in a combustion zone, e.g., an incinerator, and bringing the combustion products comprising ashes and hot combustion gas into direct contact with a fresh portion of said waste liquid in a contacting zone, e.g., an evaporator preferably by blowing the combustion products into the liquid in the evaporator thereby concentrating said fresh portion of said liquid by evaporation and at the same time forming a slurry containing the ashes dispersed in the concentrated liquid, recovering at least a part of this slurry from the contacting zone and separating it into a concentrated liquid phase as a mother liquid and a sedimentation phase, recovering a solid product from the sedimentation phase and introducing at least a portion of said concentrated liquid phase into the combustion zone as said concentrate.

The combustion of the concentrate is preferably performed in the presence of an auxiliary fuel and an excess of air at temperatures between 750° and 900° C. The heat of combustion products is then utilized to heat and concentrate the liquid in the contacting zone, while the combustion gas is bubbling through this liquid and preferably a vapor laden gas is withdrawn at the top of the evaporator and is purified by passing it through a mist separator and preferably also through a venturi scrubber.

The sediment recovered from the slurry is preferably dried by means of hot air in a drying chamber at solid product temperatures between 80° and 250° C. During the drying operation the material preferably is agitated in order to form a solid granulate end product.

The most suitable ratio between the amount of mineral ash components and the amount of concentrated waste liquid in the slurry which depends on the composition of the original waste liquid is preferably predetermined by preliminary tests. By this process the mineral content of the waste liquid is recovered mostly in the form of the incinerated ashes along with a portion of the organic components in the waste liquid and the resulting mixture can be used as a fertilizer. This process also efficiently utilizes the waste heat from the combustion step for concentrating the original waste liquid in order to save additional fuel.

According to the invention there has been further provided an apparatus for continously treating waste liquids in the above described manner.

According to this invention there is further provided a solid fertilizer composition preferably in granulate form, comprising inorganic salts, the major portion of which preferably are potassium salts, and an organic binding material.

Other objects, features and advantages of the present invention will become apparent from the following detailed description of preferred embodiments when considered together with the drawing, which is a flow-sheet illustrating a preferred embodiment of the present invention. In the FIGURE, liquid feeding means such as pipes, gas feeding means such as a blower and fertilizer feeding means such as a conveyor are omitted for convenience of illustration.

DETAILED DESCRIPTION OF THE PREFERRED EMBODIMENTS OF THE INVENTION

A waste liquid, which still contains valuable organic and inorganic material, e.g., a waste liquid from a fermentation process, which may contain between 5 and 15% of solids, the major part of which are organic compounds is treated in the following way.

A concentrate obtained from the waste fermented liquid in such a way as described hereinlater is fed into a combustion zone preferably an incinerator 1, where it is combusted, preferably together with an auxiliary fuel. The fuel is fed into the incinerator 1 through an auxiliary fuel pipe 10. Suitable auxiliary fuels comprise any liquid or gas fuels such as a bunker oil, kerosene, a petrolenum gas, a natural gas and the like. The incineration and decomposition of the concentrate preferably is performed at a temperature at least 700° C., more preferably between 700° and 1500° C. and most preferably between 750° and 900° C., and in the presence of an excess of air, i.e. at an air ratio of above 1. The air can be introduced through a pipe 11.

By combustion decomposition of the waste liquid ashes comprising particles of various size and of various components which contain potassium as a major component are formed within the incinerator 1 from the inorganic components in the waste liquid together with a waste combustion gas. It is preferred that the waste combustion gas have a temperature between 750° and 900° C. The thus formed combustion product is then introduced, through a pipe preferably a downcommer tube, into contacting zone preferably an evaporator 2, into which a fresh portion of the waste liquid is continuously introduced from a storage tank 9. The waste combustion gas is blown into the liquid in the evaporator 2 and is bubbled therethrough. By this the fresh portion of the waste liquid is heated to a temperature of about 80° and 100° C. and the moisture of the liquid is decreased by evaporation. The combustion gas is then withdrawn overhead from the evaporator 2 as a moisture saturated gas and is fed into a mist separator 3 for the removal of an entrainment and thereafter fed into a venturi scrubber.

On the other hand, most of the ashes are captured in the liquid within the evaporator 2 and at the same time form a slurry containing the ashes dispersed in the concentrated liquid in the evaporator 2. The slurry is withdrawn preferably from a lower portion of the evaporator 2 and thereafter is introduced into a decanter 5 for effecting solid-liquid separation into a concentrated mother liquid and a sediment layer. A part of the mother liquor thus separated is returned, as needed, into the evaporator 2 and the remaining part is fed into the upper section of the incinerator 1, as the afore-mentioned concentrate of the waste liquid, for spray incineration. The sediment, which is left after the separation is fed into a hot-air drying chamber 6. Since during the sedimentation the precipitate effectively entrains organic components of the concentrated original waste liquid, nearly all of its inorganic contents and a considerable amount of its organic contents, such as proteins and amino acids, are comprised in the sediment and can be recovered therefrom by drying.

In the drying chamber 6, the drying of the wet precipitate may be performed by introducing a hot gas which is supplied from a hot gas generator 8 into this drying chamber 6 and bringing it into a direct contact with the wet precipitate in order to evaporate the water which is contained therein. At the same time the precipiate which comprises the ashes is stirred within the drying chamber 6 in order to form dry granulated particles wherein the organic contents of the concentrated liquid serve as a binder. Like this, a granular fertilizer which is convenient for usage can be obtained. The waste gas from the drying chamber 6 has its dust removed within a cyclone 7 and thereafter, is fed into the venturi scrubber 4, within which the waste gas is finally made non-toxic together with the waste gas supplied from the evaporator 2. Thereafter the non-toxic gas is discharged through a smokestack 12 into the air. If necessary, the non-toxic gas may be passed through a deodorizing furnace, (not shown in the flow sheet) after passing through the venturi scrubber 4. It is preferred that the drying be effected at a solid product temperature in the vicinity of the chamber outlet not higher than 250° C., preferably at temperatures between about 100° and about 200° C. in order to prevent sticking and deterioration of the organic material.

In the present invention, the ratio between the amount of waste liquid which is incinerated and the amount which is used to prepare the slurry is dependent on the kind and the amount of minerals, which are present in the raw material. Therefore, it is preferable to predetermine the ratio by an experiment in order to find out the ratio which allows to recover as much of the organic valuable components as possible. Usually good results are obtained when the ratio is approximately within a range which provides for an amount of incinerated ashes in the dried product in the order of 50 to 75%. Of course, the higher a percentage of the incinerated ashes is present in the product, the easier the drying of this product will be effected, but the more is lost of the valuable organic contents. The composition of the product can be easily adjusted by adjusting the concentration of each of the ingredients in the evapoator or the degree of dehydration in the decanter.

As is understood from the foregoing, according to a preferred embodiment of the invention the treatment of the waste liquid is continuously performed. In this case, the volume and the composition of the liquid which is present in the evaporator and which comprises a mixture of a newly supplied fresh waste liquid and a formerly concentrated waste liquid are kept nearly constant throughout the treatment except at an initial stage thereof.

As mentioned above, the present invention provides a process in which the hot combustion gas which is produced by incinerating the waste fermentated liquid is utilized to concentrate the waste liquid itself. By this the thermal load of the incinerator is reduced and auxiliary fuel for combustion is saved. According to a preferred embodiment of the invention a mixture which comprises part of the organic components of the waste liquid in addition to the whole amount of the inorganic components in the incinerated residue is continuously recovered in a granular form which can readily be used as a highly valuable fertilizer.

If desired, the solid end product may be used as a raw material for a mixed fertilizer. For instance, the end product is blended with supplemental ingredients such as a phosphatic component, e.g. superphosphate, and a nitrogenous component, e.g. urea and ammonium sulfate, thereby to form a complete fertilizer. The process of the present invention is efficient in disposing of waste liquids from fermentation processes and thereby contributes to preventive pollution. Furthermore, the process of this invention provides for a profitable utilization of the waste products which are present in such liquids. Besides, the waste heat from the incinerator is more effectively used within this process than it is in the conventional method of waste heat recovery by means of an indirect heat exchanger and a boiler. The process of this invention also requires less equipment than the conventional process and is less expensive.

The following example will serve to further illustrate the process of the present invention.

EXAMPLE

The continuous treatment of a waste fermented liquid was carried out using the apparatus which is illustrated in the FIG. 1. A waste liquid which has been obtained from an alcohol fermentaion process using a waste molasses as raw material and which contains 10% of solid material (8% organic material and 2% inorganic material) was continuously fed from the waste liquid storage tank 9 into the evaporator 2 at a rate of 7000 kg/h and was concentrated there as follows. A concentrate obtained from the waste liquid was continuously fed into the incinerator 1 at a rate of 2930 kg/h for combustion thereof. The combustion was effected at 800° C. with 230 kg/h of a fuel oil C (Japanese Industrial Standard) as an auxiliary fuel, and the waste combustion gas and the combustion residue (ash) were continuously blown in the evaporator 2. Within the evaporator 2, the waste combustion gas and the waste liquid were brought into direct contact with each other. Thus the waste liquid was concentrated, and the moisture saturated gas of approximately 88° C. was discharged from the evaporator 2. Substantially all of the ash was collected at a rate of 123 kg/h and was dispersed in the liquid in the evaporator 2 to form a slurry. The liquid phase of the slurry in the evaporator was found to contain 21.0% of solid material. The slurry was continuously withdrawn therefrom at a rate of 3463 kg/h (3340 kg/h of the liquid phase and 123 kg/h of the ash) and transferred into the decantor 5 where a separation of the suspended ash from liquids was continuously effected. Thus, 535 kg/h of a concentrated cake containing 16.2% of solid material, 23.1% of ash and 60.7% of water was obtained. The mother liquid obtained by the separation was fed into the incinerator 1 as the afore-mentioned concentrate. The concentrated cake was then fed into the hot-gas drying chamber 6 to be dried, and 220 kg/h of a granular product having an extremely low hygroscopic property was obtained after drying.

While in this example a waste liquid, which was obtained from an alcohol fermentation process was treated according to the process of this invention, it should be understood that the process of the present invention can be applied to other fermentation waste liquids as well.

What is claimed is

1. A process for treating a fermentation waste liquid which contains organic and inorganic material comprising
    (a) combusting a concentrate of said liquid in a combustion zone, whereby combustion products comprising ashes and combustion gas are formed;
    (b) bringing said combustion products into direct contact with a fresh portion of said liquid in a contacting zone to concentrate said fresh portion of said liquid and to form a slurry comprising said ashes dispersed in the concentrated liquid in the contacting zone;
    (c) recovering at least a portion of said slurry from the contacting zone;
    (d) separating said recovered slurry into a concentrated liquid phase and a sedimentation phase;
    (e) recovering a solid product from the sedimentation phase; and
    (f) introducing at least a portion of said concentrated liquid phase into the combustion zone as said concentrate.

2. The process as defined in claim 1, wherein said combusting step (a) comprises combusting an auxiliary fuel together with said concentrate.

3. The process as defined in claim 1, wherein said combusting step (a) is performed at a temperature between 750° and 900° C.

4. The process as defined in claim 1, wherein said combusting step (a) is performed in the presence of an excess of air.

5. The process as defined in claim 1, wherein said combusting step is performed in spray incineration.

6. The process as defined in claim 1, wherein said contacting step (b) comprises continuously introducing the fresh waste liquid into the contacting zone.

7. The process as defined in claim 6, wherein the step of contacting said combustion products with said fresh portion of the liquid comprises blowing said combustion products into said liquid and allowing them to bubble through said liquid within the contacting zone.

8. The process as defined in claim 7, which further comprises withdrawing a vapor laden gas from the contacting zone.

9. The process as defined in claim 8, which further comprises purifying said vapor laden gas.

10. The process as defined in claim 9, wherein said purifying step comprises removing mist particles in a mist separator.

11. The process as defined in claim 9, wherein said purifying step comprises scrubbing the gas in a venturi scrubber.

12. The process as defined in claim 1, wherein said step (c) comprises withdrawing a slurry containing mineral ashes and concentrated liquid from the contacting zone.

13. The process as defined in claim 1, wherein the slurry forming step (b) comprises adjusting the ratio of the amount of waste liquid and the amount of combustion ashes in such a way as to provide for a mineral content of about 50 to 75% in a dried product after drying the solid phase which is obtained from said slurry.

14. The process as defined in claim 1, wherein said separating step (d) comprises separating said slurry into a sediment mixture comprising the ashes and a part of the organic components of the waste liquid and a concentrated liquid.

15. The process as defined in claim 14, which further comprises recycling a part of said concentrated liquid into the contacting zone.

16. The process as defined in claim 14, wherein said separating step is done by decantation.

17. The process as defined by claim 1, wherein said recovering step (e) comprises drying the sediment.

18. The process as defined in claim 17, wherein the drying is effected in a drying chamber by means of a hot gas.

19. The process as defined in claim 18, which comprises forming a granulate solid product by agitation of the mixture during the drying step.

* * * * *